(12) United States Patent
Ikemoto

(10) Patent No.: US 8,851,390 B2
(45) Date of Patent: Oct. 7, 2014

(54) READER/WRITER ANTENNA MODULE AND ANTENNA DEVICE

(71) Applicant: Murata Manufacturing Co., Ltd., Nagaokakyo (JP)

(72) Inventor: Nobuo Ikemoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 151 days.

(21) Appl. No.: 13/731,207

(22) Filed: Dec. 31, 2012

(65) Prior Publication Data

US 2013/0112754 A1    May 9, 2013

Related U.S. Application Data

(63) Continuation of application No. PCT/JP2011/070776, filed on Sep. 13, 2011.

(51) Int. Cl.
| | |
|---|---|
| *G06K 19/07* | (2006.01) |
| *H01Q 17/00* | (2006.01) |
| *H01Q 1/52* | (2006.01) |
| *G06K 7/10* | (2006.01) |
| *H01Q 1/38* | (2006.01) |
| *H01Q 1/22* | (2006.01) |
| *H01Q 7/00* | (2006.01) |

(52) U.S. Cl.
CPC .......... *H01Q 1/2216* (2013.01); *H01Q 17/004* (2013.01); *H01Q 1/526* (2013.01); *G06K 7/10336* (2013.01); *H01Q 1/38* (2013.01); *H01Q 7/00* (2013.01)
USPC .......................................... 235/492; 235/488

(58) Field of Classification Search
USPC ................................................ 235/488, 492
See application file for complete search history.

(56) References Cited

U.S. PATENT DOCUMENTS

| | | | |
|---|---|---|---|
| 7,924,228 B2* | 4/2011 | Ochi et al. | ............. 343/700 MS |
| 2008/0036608 A1 | 2/2008 | Sakama | |
| 2009/0173795 A1 | 7/2009 | Ochi et al. | |
| 2012/0056796 A1 | 3/2012 | Kato et al. | |

FOREIGN PATENT DOCUMENTS

| | | |
|---|---|---|
| CN | 101122970 A | 2/2008 |
| JP | 05-243741 A | 9/1993 |
| JP | 07-335443 A | 12/1995 |
| JP | 2001-251129 A | 9/2001 |
| JP | 2007-286797 A | 11/2007 |
| TW | 200402814 B | 10/2006 |
| WO | 2007/105469 A1 | 9/2007 |
| WO | 2010/131524 A1 | 11/2010 |

OTHER PUBLICATIONS

Official Communication issued in International Patent Application No. PCT/JP2011/070776, mailed on Dec. 27, 2011.
Official Communication issued in corresponding Japanese Patent Application No. 2012-534005, mailed on Jan. 28, 2014.

* cited by examiner

*Primary Examiner* — Daniel Hess
(74) *Attorney, Agent, or Firm* — Keating & Bennett, LLP

(57) ABSTRACT

A reader/writer antenna module includes a flexible substrate that includes a first base portion, a second base portion and a bending portion that connects the first base portion and the second base portion to each other. The flexible substrate has a structure that is folded by utilizing the flexibility of the bending portion such that a first main surface of the first base portion and a first main surface of the second base portion face each other, and a magnetic layer is provided between an antenna conductor and the chip component in the folded structure.

20 Claims, 14 Drawing Sheets

1

1

US 8,851,390 B2

READER/WRITER ANTENNA MODULE AND ANTENNA DEVICE

BACKGROUND OF THE INVENTION

1. Field of the Invention

The present invention relates to reader/writer antenna modules, and in particular relates to HF-band reader/writer antenna modules preferably for use in short-range communication with radio frequency identification (RFID) tags and to antenna devices including HF-band reader/writer antenna modules.

2. Description of the Related Art

An RFID system in which communication is performed between a reader/writer and an RFID tag using a non-contact method so as to transmit information between the reader/writer and the RFID tag is an example of a known merchandise management system. The reader/writer includes a wireless IC for processing wireless signals and an antenna for transmitting and receiving wireless signals. Predetermined information is transmitted and received in the form of high-frequency signals via an electromagnetic field between an antenna of the RFID tag and an antenna of the reader/writer.

In recent years, the field of use of RFID systems has been becoming wider and wider and there are applications in which a reader/writer is mounted in, for example, a mobile communication terminal. Consequently, reader/writers have been becoming increasingly smaller in size and card-type reader/writer antenna modules have been proposed such as the one described in International Publication No. WO 2007/105469. This antenna module has a structure in which an antenna conductor, a semiconductor memory and so forth are integrated with flexible wiring substrates, and a substrate on which an antenna conductor has been provided and a substrate on which a chip-type component such as a semiconductor memory has been provided are stacked one on top of the other and the substrates are connected to each other with flexible lead wiring.

In this structure, the substrate on which the antenna conductor is provided is stacked on a surface of the substrate, on which the chip-type component is provided, on the side opposite to the surface on which the chip-type component is provided. Consequently, the chip-type component is exposed on the surface and in order to protect the chip-type component from external noise and external stress, for example, a metal case or a resin layer needs to be separately provided. In addition, the substrate on which the antenna conductor is provided and the substrate on which the mounted component is provided are directly affixed to each other and therefore the curvature of the lead wiring connecting the substrates is small and sometimes the reliability of conduction between the substrates is not sufficiently secured due to the large bending stress acting on the lead wiring.

SUMMARY OF THE INVENTION

In view of the above-described problems, a reader/writer antenna module according to a preferred embodiment of the present invention includes a flexible substrate that includes a first base portion, a second base portion and a bending portion that connects the first base portion and the second base portion. The flexible substrate has a structure that is folded by utilizing the flexibility of the bending portion such that a first main surface of the first base portion and a first main surface of the second base portion face each other (hereafter, folded structure), and includes a magnetic layer arranged between an antenna conductor and a chip-type component in this folded structure.

In a preferred embodiment of the present invention, since a magnetic layer is interposed between the antenna conductor and the chip-type component (more specifically between the antenna conductor and an RF circuit including the chip-type component), it can be ensured that the antenna conductor and the chip-type component (more specifically, the RF circuit) are isolated from each other and the chip-type component can be reliably protected from external noise and external stress. In addition, since the chip-type component and the magnetic layer are arranged between the first base portion and the second base portion, it is possible for a connection conductor to have a comparatively large curvature and consequently bending stress acting on the connection conductor is reduced and reliability of conduction between the substrates can be secured.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereafter, preferred embodiments of the present invention will be described.

First Preferred Embodiment

Figure 1:
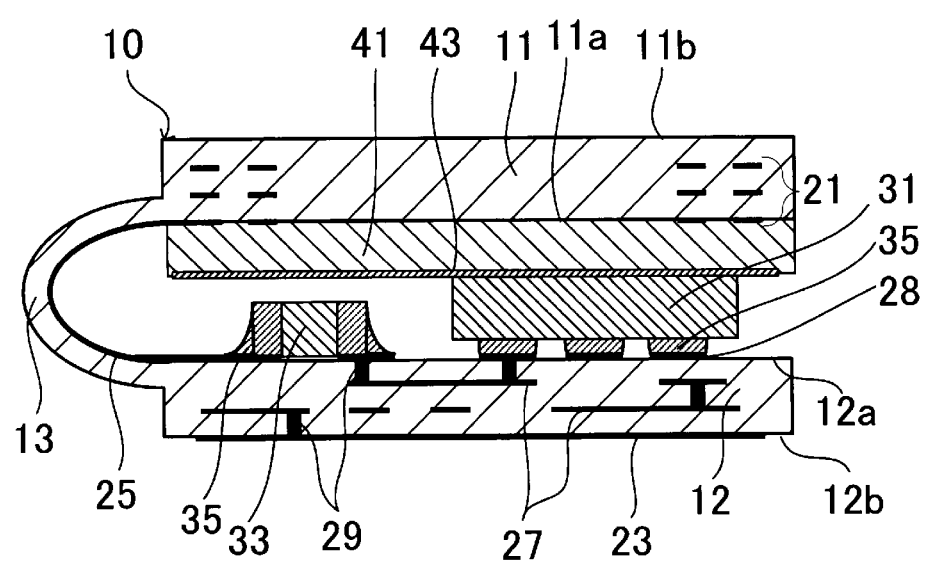
FIG. 1 is a sectional view illustrating a reader/writer antenna module according to a preferred embodiment of the present invention.
Figure 2A:
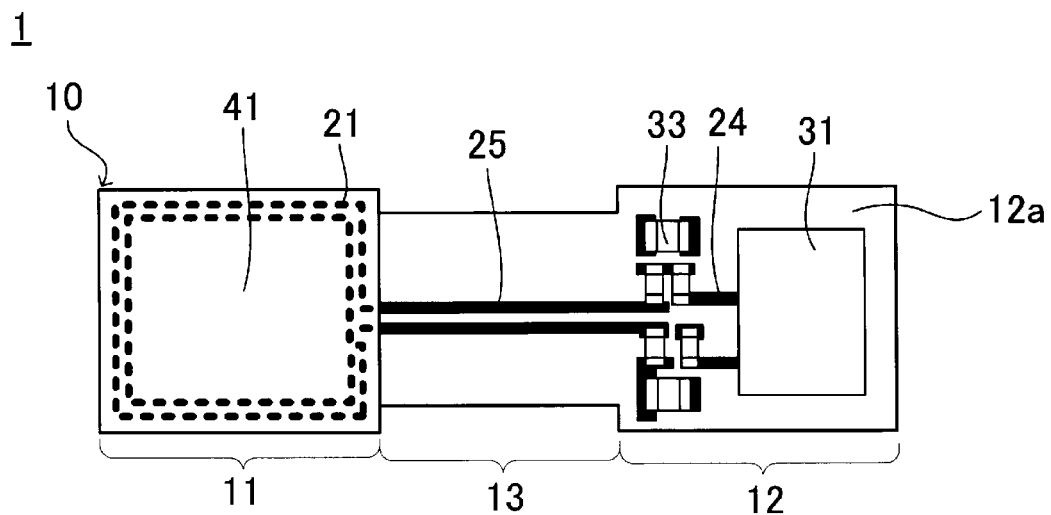
FIGS. 2A, 2B and 2C are views illustrating the structure of the reader/writer antenna module according to a preferred embodiment of the present invention before and after being folded.
Figure 2B:
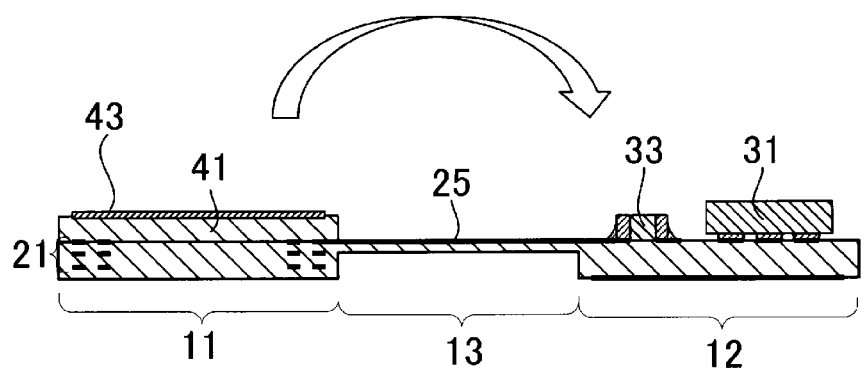
Figure 2C:
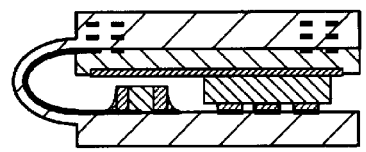

FIG. 1 is a sectional view illustrating a reader/writer antenna module according to a preferred embodiment of the present invention. In addition, FIGS. 2A and 2B are a top view and a sectional view illustrating the structure of the reader/writer antenna module according to the present preferred embodiment of the present invention before and after being folded. FIG. 2A is a top view of the structure of the reader/writer antenna module before folding. In addition, FIG. 2B is a sectional view of the structure of the reader/writer antenna module before folding. In addition, FIG. 2C is a sectional view of the structure of the reader/writer antenna module after folding. The reader/writer antenna module of the present preferred embodiment is structured as a HF-band reader/writer antenna module preferably for use in short-range communication with an RFID tag.

A flexible substrate 10 includes a first base portion 11, a second base portion 12 and a bending portion 13 that connects the first base portion 11 and the second base portion 12 to each other. The flexible substrate 10 is preferably made of a flexible resin sheet that possesses flexibility and elasticity such as a liquid crystal polymer or a polyimide, and the first base portion 11, the second base portion 12 and the bending portion 13 preferably are integrally formed with each other by using the flexible resin sheet. In addition, a multilayer body that is preferably formed by stacking a plurality of flexible resin sheets is provided in at least the first base portion 11 and the second base portion 12. Thus, since the flexible substrate 10 is a multilayer body including identical flexible resin sheets, the substrate can be manufactured using a so-called sheet stacking process, for example.

For example, the flexible substrate 10 can be manufactured using a simple process without using a complex process such as one in which the first base portion 11 and the second base portion 12 are manufactured and then connected to each other using the bending portion 13. In addition, since there is no need for a connection component such as a connector arranged to connect the first base portion 11 and the bending portion 13 and a connector arranged to connect the second base portion 12 and the bending portion 13, in particular, impedance matching between an antenna conductor 21 and an RF circuit is simple. The rigidity of the first base portion 11 and the rigidity of the second base portion 12 depend on, for example, the thickness thereof, the density of wiring, the wiring material, the presence or absence of a magnetic layer and the presence or absence of a chip-type component. Therefore, the rigidity of the first base portion 11 and the second base portion 12 vary with thickness, wiring density and rigidity of wiring materials. In addition, the rigidity becomes relatively high with the presence of the magnetic layer 41 and chip-type components 31 and 33.

The first base portion 11 of the flexible substrate 10 is provided with the antenna conductor 21, which includes a conductor pattern preferably made of, for example, a metal foil. The antenna conductor 21 preferably is structured as a coil-shaped antenna conductor preferably formed by stacking in a plurality of layers conductor patterns that loop through a plurality of turns and is provided on the outermost layer and in inner layers of the first base portion 11. The conductor patterns may be connected to one another through capacitive coupling or may be connected to one another through connection conductors preferably made of, for example, conductive paste.

In addition, the magnetic layer 41, in which a magnetic powder such as ferrite is distributed in a resin material, is provided on a first main surface 11a of the first base portion 11. The magnetic layer 41 has larger outer dimensions than the antenna conductor 21. The magnetic layer 41 preferably has outer dimensions that are equal to or larger than those of the first base portion 11.

The second base portion 12 of the flexible substrate 10 is provided with an RF circuit. This RF circuit preferably includes the chip-type components 31 and 33 and wiring conductors 24 (refer to FIGS. 2A-2C) to provide connections to the chip-type components 31 and 33. In this preferred embodiment, a wireless IC is illustrated as the chip-type component 31 and chip capacitors are illustrated as the chip-type components 33, for example. The chip-type components 31 and 33 are mounted on the first main surface 12a of the second base portion 12 preferably via surface conductors (lands) 28 and bonding material 35 such as solder. Examples of chip-type components include active components such as wireless ICs including memory circuits and logic circuits and liquid crystal oscillators, and passive components such as chip capacitors, chip inductors and chip resistors.

In addition, inner conductors 27 and connection conductors 29 are provided in inner layers of the second base portion 12. The inner conductors 27 are provided on the surfaces of the flexible resin sheets. In addition, the connection conductors 29 are preferably formed by forming through holes in the flexible resin sheets and filling the through holes with conductive paste. The inner conductors 27 and the connection conductors 29 are electrically connected to the surface conductors 28. The inner conductors 27 and the connection conductors 29 may be arranged in the inner layers of the second base portion so as to have a capacitance or an inductance in line with design values.

The bending portion 13 of the flexible substrate 10 is provided with a connection conductor 25 to electrically connect the antenna conductor 21 provided in the first base portion 11 and the RF circuit of the second base portion 12. The connection conductor 25 is preferably made of a flexible conductor material such as a metal foil.

In the reader/writer antenna module 1 of the present preferred embodiment, the flexible substrate 10 preferably has a structure that is folded utilizing the flexibility of the bending portion 13 such that the first main surface 11a of the first base portion 11 and the first main surface 12a of the second base portion 12 face each other to provide a folded structure. The first main surface 11a of the first base portion and the first main surface 12a of the second base portion 12 define the same surface prior to being folded. The magnetic layer 41 is arranged between the antenna conductor 21 and the chip-type components 31 and 33. Thus, since the magnetic layer 41 is present between the antenna conductor 21 and the chip-type components 31 and 33 (more specifically between the antenna conductor 21 and the RF circuit), it can be ensured that the antenna conductor 21 and the RF circuit are isolated from each other and the chip-type components and 33 can be protected from external noise and external stress. In addition, since the chip-type components 31 and 33 and the magnetic layer 41 are arranged between the first base portion 11 and the second base portion 12, a comparatively large curvature can be secured for the connection conductor 25 provided on the bending portion 13, and consequently the stress acting on the connection conductor 25 is small and reliability of conduction between the first base portion 11 and the second base portion 12 can be secured.

In this preferred embodiment, a ground conductor 23 is provided on the second base portion 12 so as to substantially cover a region in which the RF circuit is provided in plan view. In this preferred embodiment, the ground conductor 23 is provided on the second main surface 12b of the second base portion 12. The chip-type components 31 and 33 on the second base portion 12 are arranged between the magnetic layer 41 and the ground conductor 23. Therefore, the RF circuit can be better isolated from external noise, the isolation characteristics of the RF circuit are improved and a reader/writer antenna module having high reliability can be provided.

In addition, in the reader/writer antenna module 1 of this preferred embodiment, an adhesive layer 43 is provided on the surface of the magnetic layer 41, and the magnetic layer 41 and the chip-type component 31 are adhered to each other via the adhesive layer 43. In this preferred embodiment, the adhesive layer 43 is a sheet-shaped adhesive sheet such as double-sided tape. That is, a folded structure in which the first base portion 11 and the second base portion 12 face each other can be secured by using this adhesive sheet. This adhesive sheet adheres to the upper surface of the chip-type component 31, which has the greatest height among the chip-type components 31 and 33, and this greatest-height chip-type component 31 is mounted on a side of the second base portion 12 farther away from the bending portion 13 side than a position in the center of the second base portion 12. Thus, a reader/writer antenna module can be provided in which the folded state of the first base portion 11 and the second base portion 12 is readily maintained and that is therefore excellent in terms of shape stability.

In addition, in this preferred embodiment, in the folded structure, the connection conductor 25 on the bending portion 13 is provided so as to be positioned on the inner side of a folded structure. Consequently, a folded structure can be realized with which the risk of the connection conductor 25 being broken is small and that is excellent in terms of connection reliability.

Solder resist patterns may be formed as needed, for example, on the connection conductor 25 and the ground conductor 23 provided on the outermost layers of the flexible substrate 10. In addition, the adhesive layer 43 is not limited to being a sheet-shaped adhesive sheet and may be instead formed of another type of adhesive, for example.

Figure 3A:
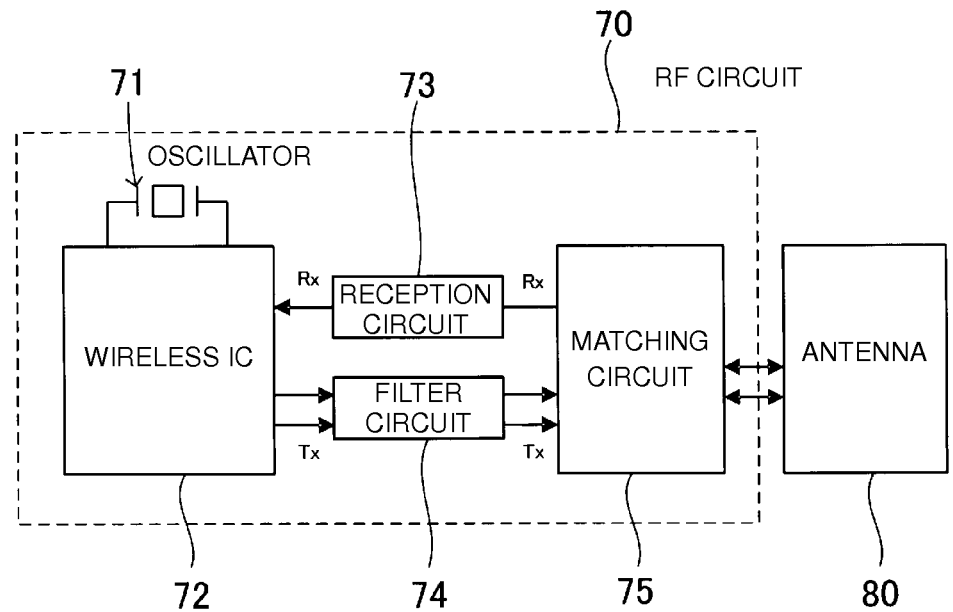
FIGS. 3A and 3B are circuit diagrams illustrating the reader/writer antenna module according to a preferred embodiment of the present invention.
Figure 3B:
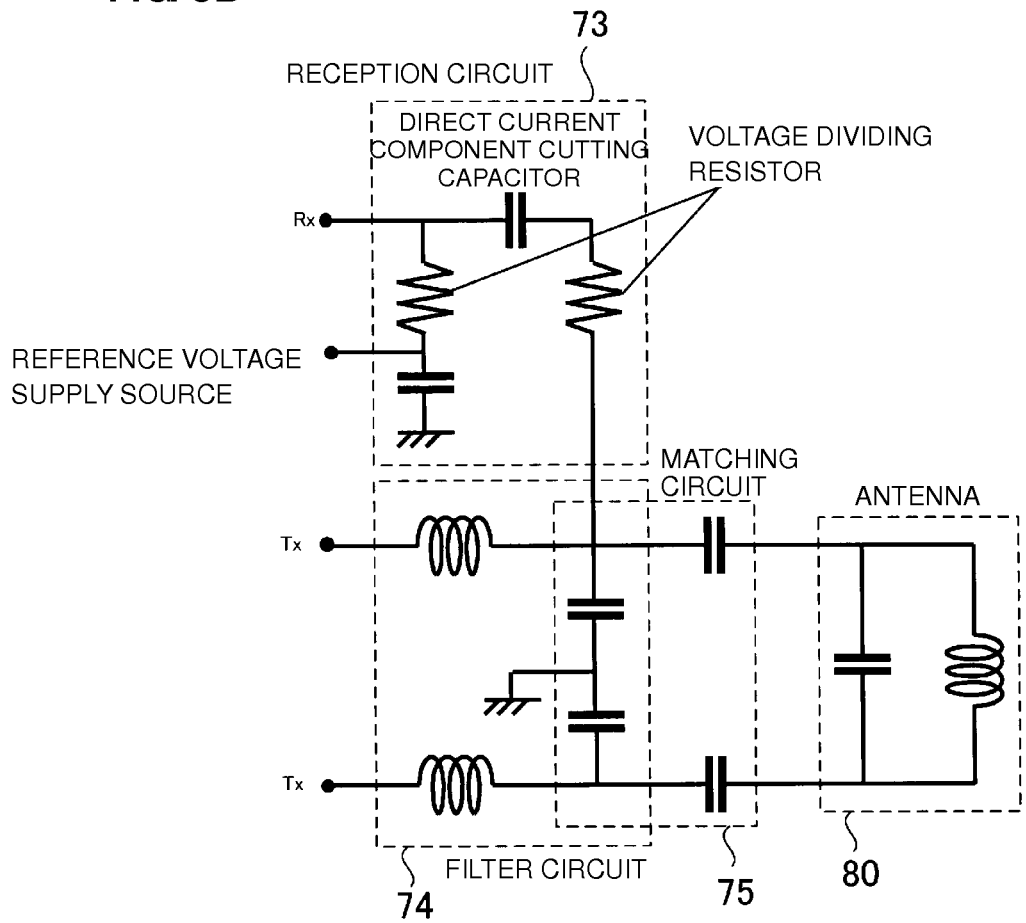

FIGS. 3A and 3B illustrate an example of circuit diagrams used for the reader/writer antenna module according to a preferred embodiment of the present invention. FIG. 3A is a block diagram. The reader/writer antenna module of this preferred embodiment preferably includes a reception circuit 73, a filter circuit 74 and a matching circuit 75 between a wireless IC 72 and an antenna 80. An RF circuit 70 preferably includes an oscillator 71, the wireless IC 72, the reception circuit 73, the filter circuit 74 and the matching circuit 75. A transmission signal output from the wireless IC 72 is transmitted to the antenna 80 using a balanced path via the filter circuit 74 and the matching circuit 75. On the other hand, a reception signal received by the antenna 80 is transmitted to the wireless IC 72 using an unbalanced path via the matching circuit 75 and the reception circuit 73. The RF circuit 70 may be connected to another circuit, which is not illustrated, via, for example, a connector. As an example of a connection to another circuit, for example, a connection to a control circuit can be considered.

FIG. 3B is an actual circuit diagram of the reception circuit 73, the filter circuit 74, the matching circuit 75 and the antenna 80.

The filter circuit 74 and the matching circuit 75 share some capacitors. A transmission signal is transmitted to an antenna 80 via the filter circuit 74 and the matching circuit 75. In addition, a reception signal output from the matching circuit 75 is input to the reception circuit 73. The reception circuit 73 preferably is a bias circuit arranged to adjust the direct current potential and amplitude of a reception signal.

Second Preferred Embodiment

Figure 4:
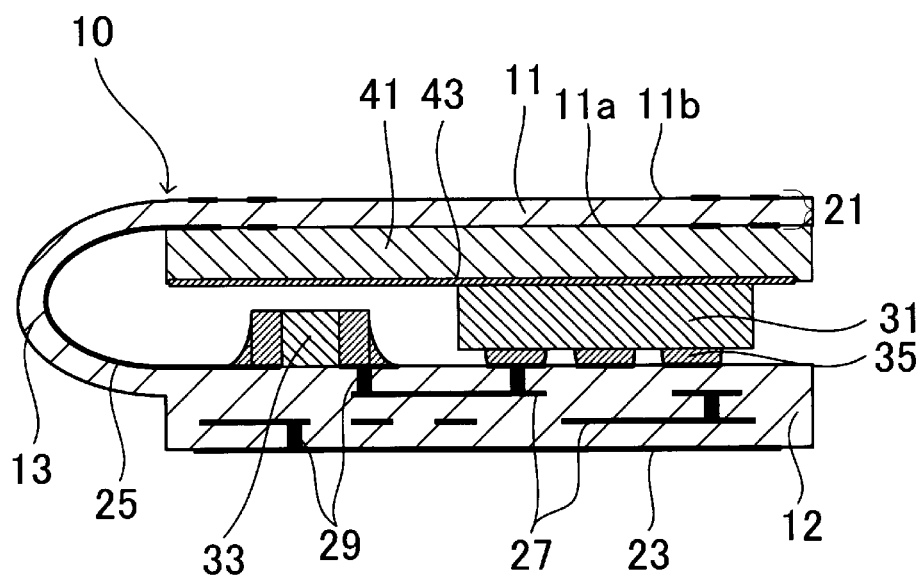
FIG. 4 is a sectional view illustrating a reader/writer antenna module according to a preferred embodiment of the present invention.

FIG. 4 is a sectional view illustrating a reader/writer antenna module according to a second preferred embodiment of the present invention.

The first base portion 11 may include a single layer flexible resin sheet as in the reader/writer antenna module 1 according to the first preferred embodiment. In this case, as illustrated, the antenna conductor 21 may be a two-layer coil-shaped antenna conductor located on the front and back surfaces of the flexible resin sheet or may be a single-layer coil-shaped antenna provided on only the first main surface 11a (or the second main surface 11b) of the first base portion 11. This antenna preferably includes a plurality of turns, but may instead include just one turn. The second base portion 12 may also include a single-layer flexible resin sheet.

Third Preferred Embodiment

Figure 5A:
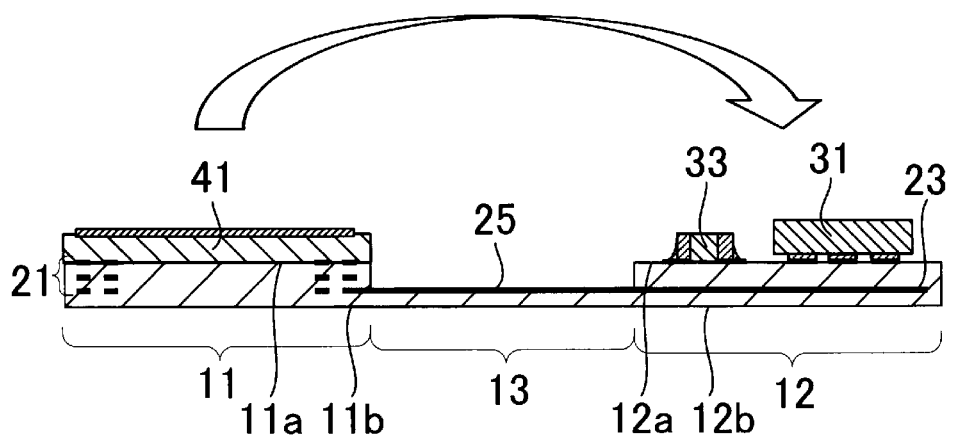
FIGS. 5A and 5B are views illustrating the structure of a reader/writer antenna module according to a preferred embodiment of the present invention before and after being folded.
Figure 5B:
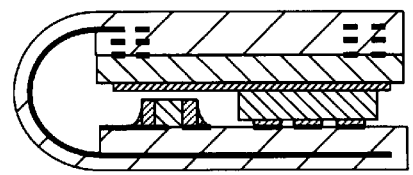

FIGS. 5A and 5B are sectional views illustrating the structure of a reader/writer antenna module according to a third preferred embodiment of the present invention before and after being folded. FIG. 5A is a sectional view of before folding and FIG. 5B is a sectional view of after folding.

The bending portion 13 may be connected to the first base portion 11 and the second base portion 12 at the side of surfaces opposite to the first main surfaces 11a and 12a (second main surfaces 11b and 12b), as in the reader/writer antenna module 1 according to the first preferred embodiment. With this folded structure, the curvature of the connection conductor 25 can be made larger. In addition, the ground conductor 23 in the second base portion 12 may be provided in an inner layer of the second base portion 12.

Fourth Preferred Embodiment

Figure 6:
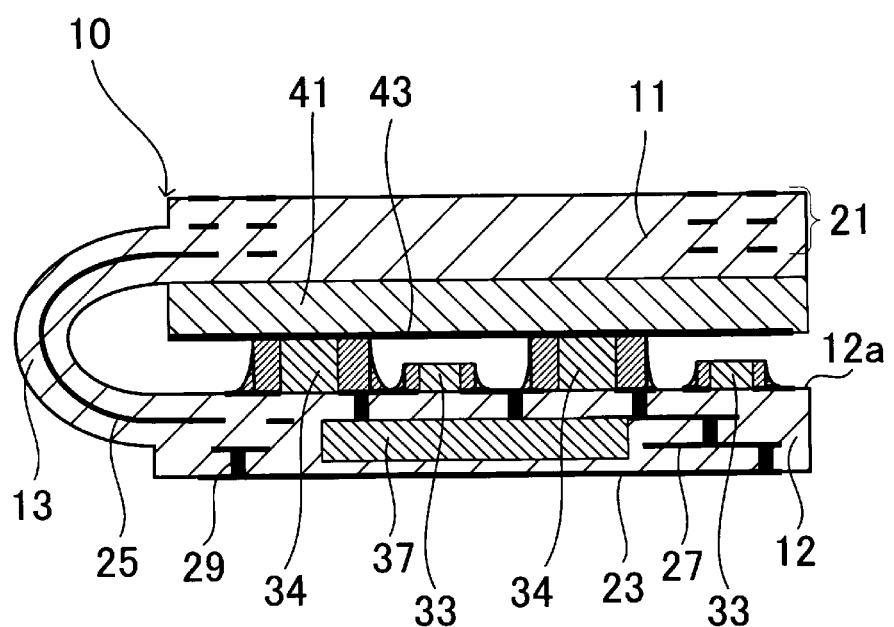
FIG. 6 is a sectional view illustrating a reader/writer antenna module according to a preferred embodiment of the present invention.

FIG. 6 is a sectional view illustrating a reader/writer antenna module according to a fourth preferred embodiment of the present invention. A chip-type component (in this preferred embodiment, a wireless IC, for example) 37 may be built into the second base portion 12, as in the reader/writer antenna module 1 according to the first preferred embodiment. In this case, the upper surfaces of chip-type components 34, which have the greatest height among the chip-type components 33 and 34 mounted on the first main surface 12a of the second base portion 12 can be used as surfaces to be adhered to the adhesion layer 43. In addition, the connection conductor 25 in the bending portion 13 may be provided between layers of flexible resin sheets.

Fifth Preferred Embodiment

Figure 7A:
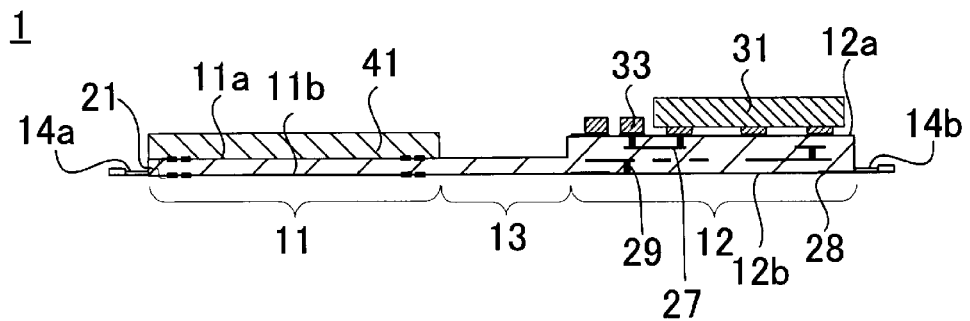
FIGS. 7A-7C include a sectional view, a top view and a bottom view illustrating the structure of a reader/writer antenna module according to a preferred embodiment of the present invention before being folded.
Figure 7B:
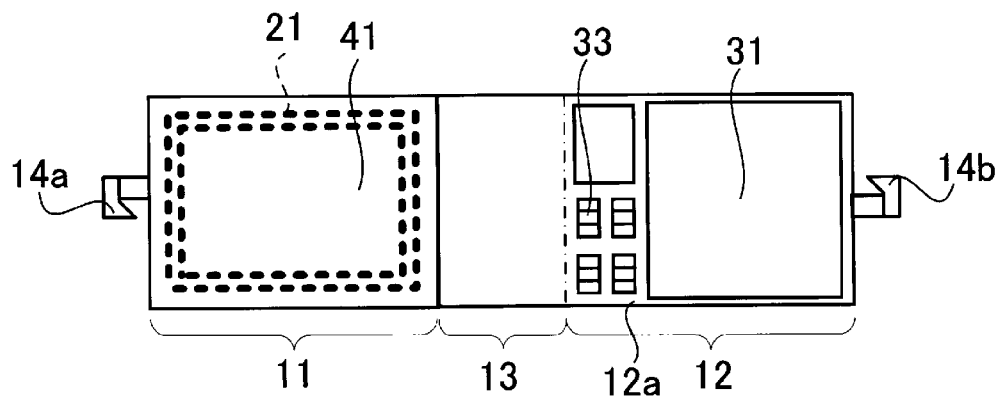
Figure 7C:
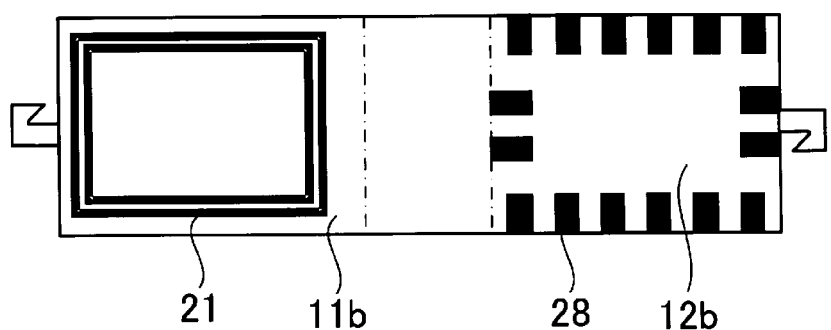
Figure 8A:
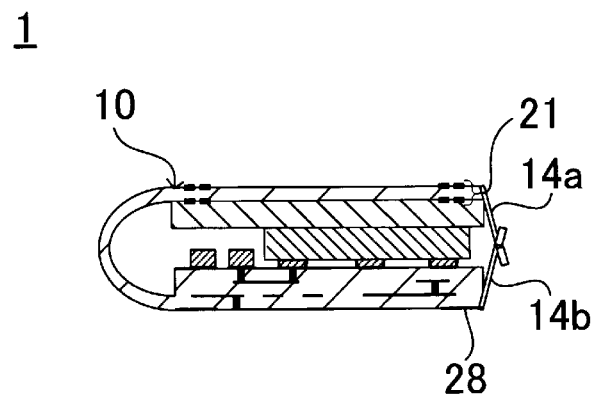
FIGS. 8A-8C include a sectional view, a top view and a bottom view illustrating the structure of the reader/writer antenna module according to a preferred embodiment of the present invention after being folded.
Figure 8B:
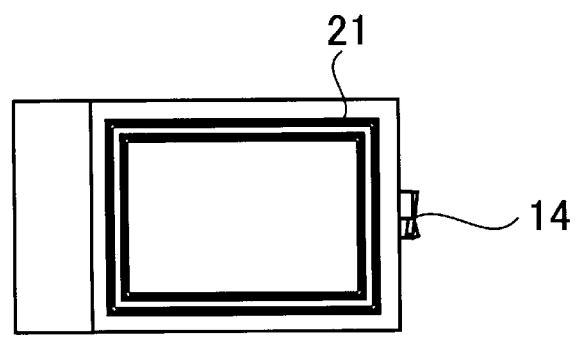
Figure 8C:
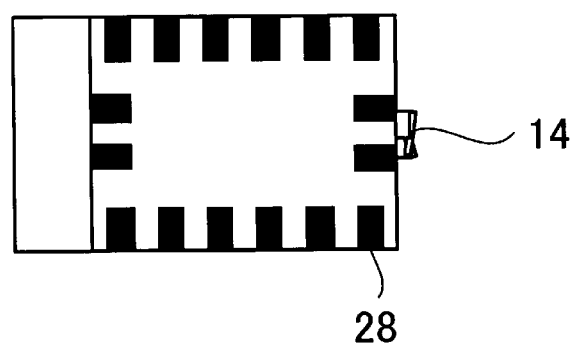

FIGS. 7A-7C illustrate the structure of a reader/writer antenna module according to a fifth preferred embodiment of the present invention before being folded. FIG. 7A is a sectional view, FIG. 7B is a top view and FIG. 7C is a bottom view. In addition, FIGS. 8A-8C illustrate the structure after folding. FIG. 8A is a sectional view, FIG. 8B is a top view and FIG. 8C is a bottom view.

The antenna conductor 21 is exposed on the second main surface 11b on the side of the first base portion 11 on which the magnetic layer 41 is not provided. In addition, the surface conductors 28 are provided on the second main surface 12b on the side of the second base portion 12 on which the chip-type components 31 and 33 are not mounted. The surface conductors 28 are electrically connected to the inner conductors 27 and interlayer conductors 29 within the second base portion 12. After folding, the antenna conductor 21 and the surface conductors 28 are exposed on the surfaces of the reader/writer antenna module. The surface conductors 28 are to be connected to, for example, a printed wiring board via a bonding material.

In addition, the folded structure is maintained without using an adhesive sheet by engaging a hook portion 14a provided on the first base portion 11 and a hook portion 14b provided on the second base portion 12 with each other. Alternatively, a configuration may be adopted in which the hook portions 14a and 14b are engaged with each other in addition to using an adhesive sheet.

The hook portions 14a and 14b can also be formed integrally with the first base portion 11, the second base portion 12 and the bending portion 13 using the same material. In addition, since the folded structure is maintained by the hook portions 14a and 14b, it is possible to easily switch between the non-folded structure and the folded structure by unfastening the hook portions 14a and 14b.

Sixth Preferred Embodiment

Figure 9A:
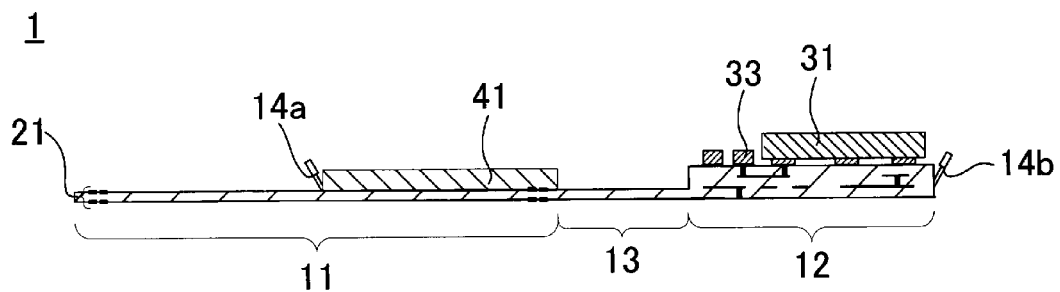
FIGS. 9A-9C include a sectional view, a top view and a bottom view illustrating the structure of a reader/writer antenna module according to a preferred embodiment of the present invention before being folded.
Figure 9B:
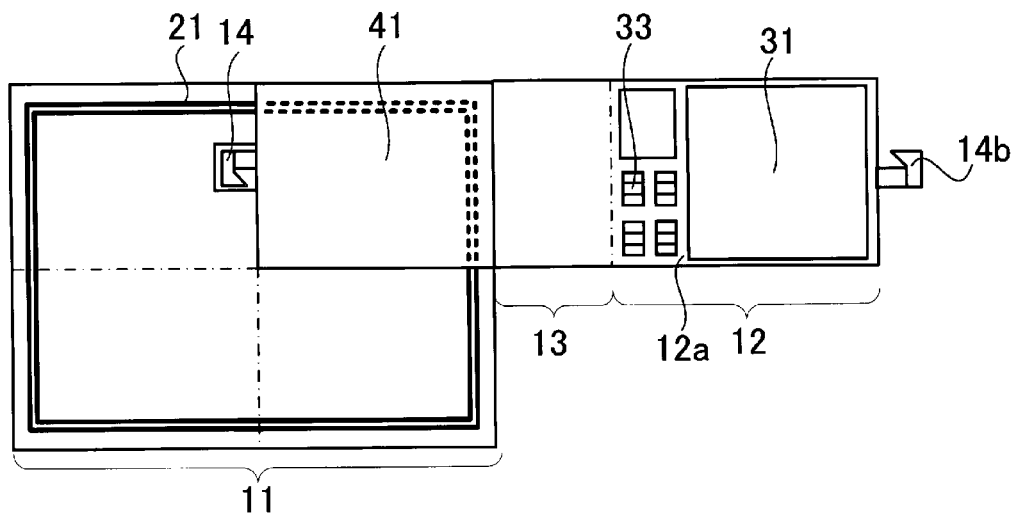
Figure 9C:
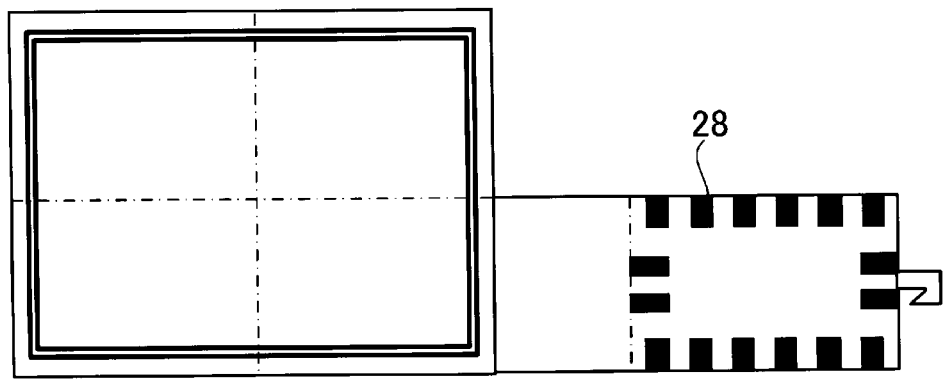
Figure 10A:
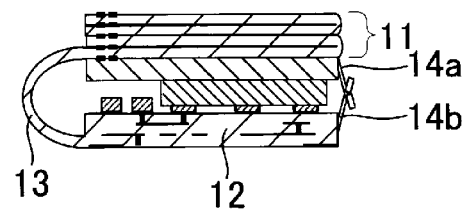
FIGS. 10A-10C include a sectional view, a top view and a bottom view illustrating the structure of the reader/writer antenna module according to a preferred embodiment of the present invention at the time of mounting.
Figure 10B:
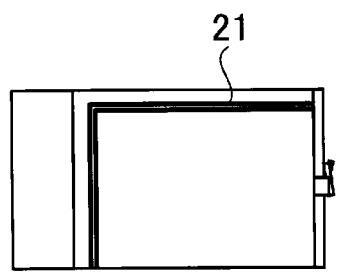
Figure 10C:
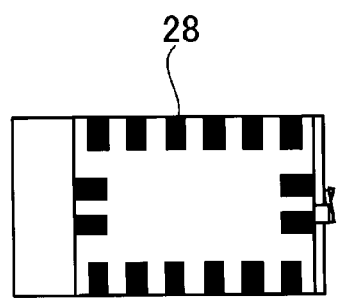
Figure 11A:
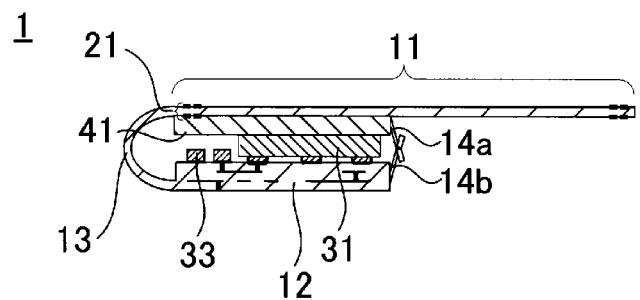
FIGS. 11A-11C include a sectional view, a top view and a bottom view illustrating the structure of the reader/writer antenna module according to a preferred embodiment of the present invention at the time of use.
Figure 11B:
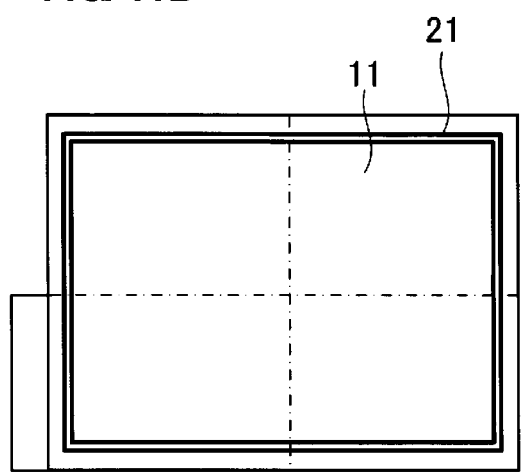
Figure 11C:
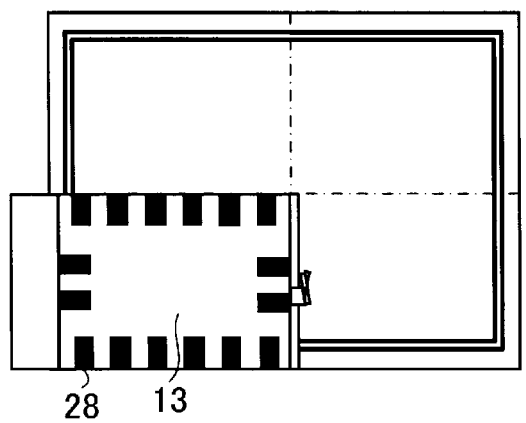

FIGS. 9A-9C illustrate the structure of a reader/writer antenna module according to a sixth preferred embodiment of the present invention before being folded. FIG. 9A is a sectional view, FIG. 9B is a top view and FIG. 9C is a bottom view. In addition, FIGS. 10A-10C illustrate the structure at the time of mounting. FIG. 10A is a sectional view, FIG. 10B is a top view and FIG. 10C is a bottom view. In addition, FIGS. 11A-11C illustrate the structure at the time of use. FIG. 11A is a sectional view, FIG. 11B is a top view and FIG. 11C is a bottom view.

In this preferred embodiment, the first base portion 11 preferably has a twice-folded structure. By adopting this structure, it is possible to increase the area of the opening formed by the antenna conductor 21 while retaining the small size of the second base portion 12.

At the time of supply of and the time of mounting of the reader/writer antenna module, as illustrated in FIGS. 10A-10C, the first base portion 11 is folded and as a result has approximately the same dimensions as the second base portion 12, and the hook portions 14a and 14b are fastened together. Thus, an SMD type component can be formed. Accordingly, it is possible to tape this module in the same manner as a typical component. In addition, after mounting the module on a substrate using a chip mounter, reflow mounting can also be performed.

At the time of use of the reader/writer antenna module, as illustrated in FIGS. 11A-11C, the first base portion 11 is expanded by unfastening the hook portions 14a and 14b. Then, in a state in which the first base portion 11 has been expanded, the magnetic layer 41 can be arranged between the antenna conductor 21 and the chip-type components 31 and 33 by fastening once again the hook portions 14a and 14b.

Seventh Preferred Embodiment

Figure 12:
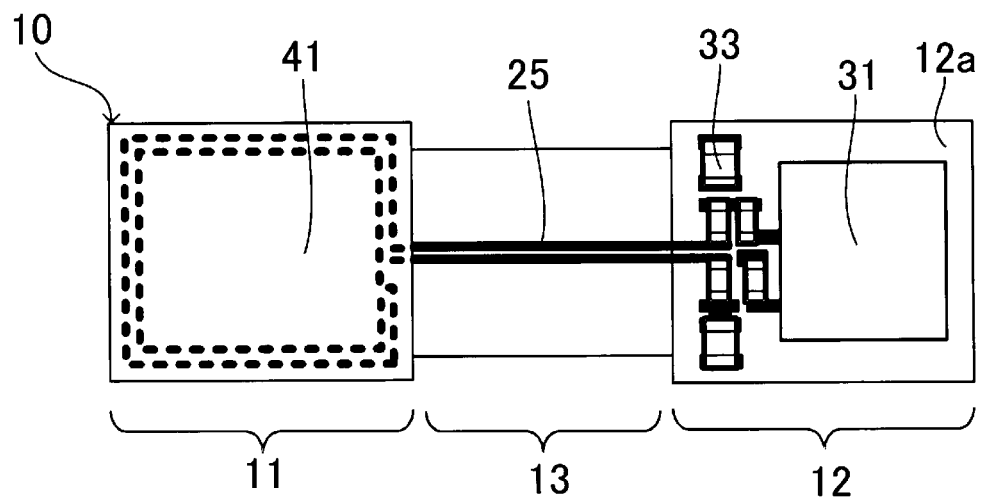
FIG. 12 is a top view illustrating a reader/writer antenna module according to a preferred embodiment of the present invention.

FIG. 12 is a top view illustrating a reader/writer antenna module according to a seventh preferred embodiment of the present invention. In the reader/writer antenna module 1 of this preferred embodiment, among the chip-type components 31 and 33 mounted on the first main surface 12a of the second base portion 12, it is preferable that the longitudinal direction of the chip-type components (in this preferred embodiment, chip capacitors, for example) 33, which are arranged on a side of the second base portion 12 closer to the bending portion 13 than a position in the center of the second base portion 12, be arranged so as to be parallel with a boundary line between the second base portion 12 and the bending portion 13. Since a greater bending stress acts on the side of the second base portion 12 closer to the bending portion 13 than a position in the center of the second base portion 12 when the bending portion 13 is folded, the chip-type components 33 can be prevented from falling off at the time of folding by arranging the chip-type components 33 in this manner.

Eight Preferred Embodiment

Figure 13A:
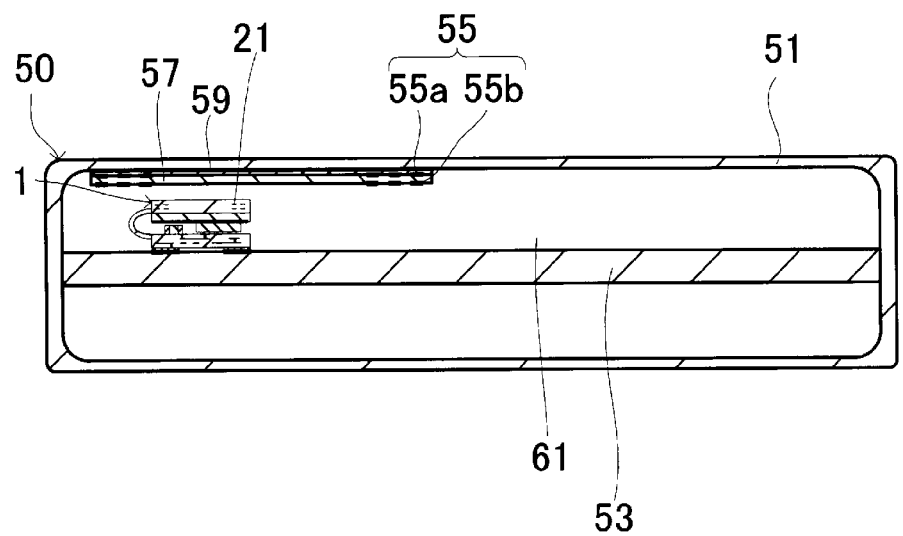
FIGS. 13A and 13B include a sectional view and a top view illustrating an antenna device according to a preferred embodiment of the present invention.
Figure 13B:
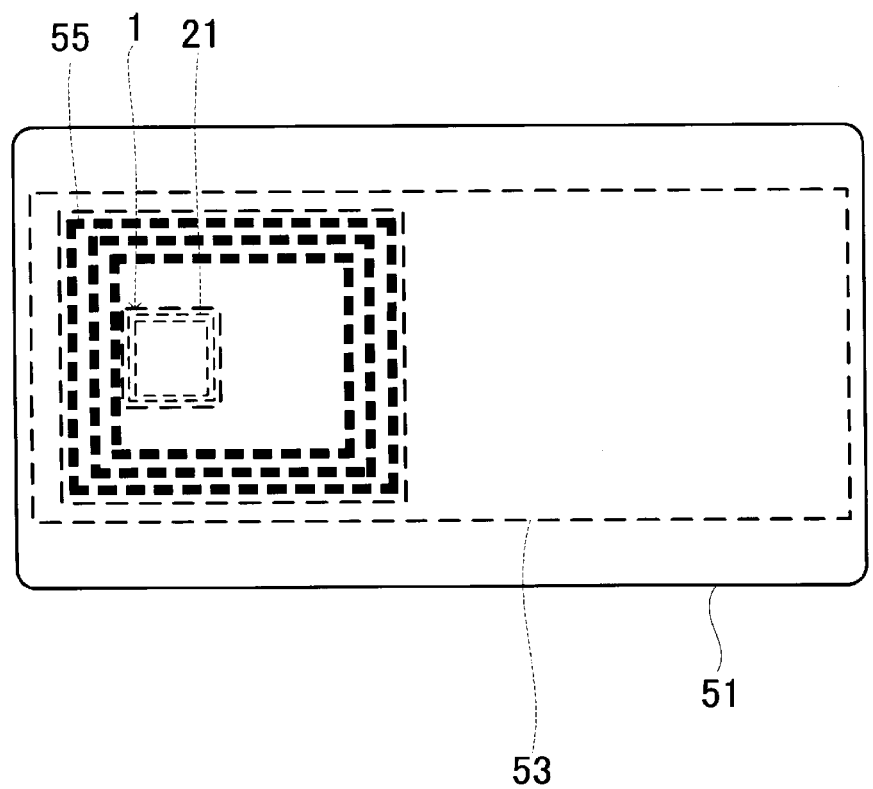
Figure 14A:
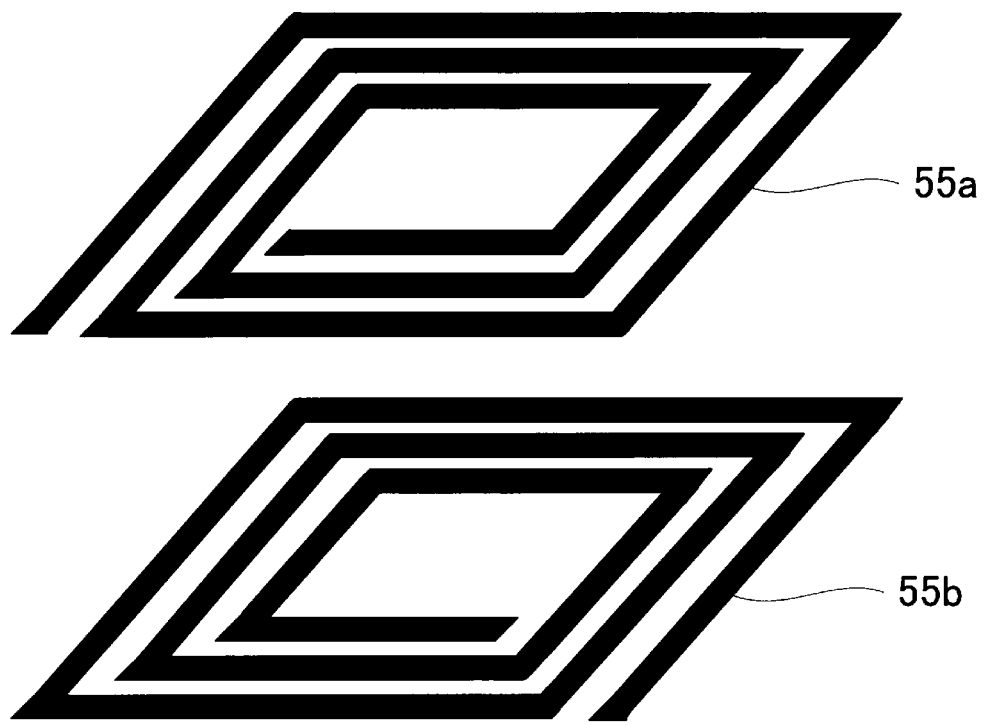
FIGS. 14A and 14B include a perspective view and an equivalent circuit diagram illustrating a booster antenna according to a preferred embodiment of the present invention.
Figure 14B:
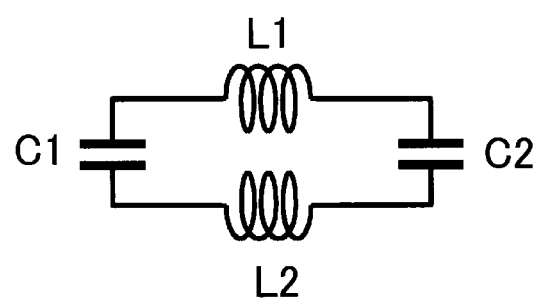

FIGS. 13A and 13B illustrate an antenna device according to a preferred embodiment of the present invention. FIG. 13A is a sectional view and FIG. 13B is a top view illustrating the positional relationship between a booster antenna and a reader/writer antenna module. In addition, FIGS. 14A and 14B are a perspective view and an equivalent circuit diagram of the booster antenna.

The size of the antenna conductor of the reader/writer antenna modules described in the first through seventh preferred embodiments preferably is comparatively small. Consequently, in cases where it is necessary to secure a large communication range, it is preferable to add an antenna booster as illustrated in FIGS. 13A and 13B.

An antenna device 50 includes the reader/writer antenna module 1, a printed wiring board 53, a booster antenna 55, a base sheet 57, an adhesive layer 59 and a casing 51.

The reader/writer antenna module 1 is mounted on a surface of the printed wiring board 53 via bonding material 61. In addition, a feeder circuit (not illustrated), which feeds electricity to the reader/writer antenna module, is provided on the printed wiring board 53. The printed wiring board 53 is housed inside the casing 51.

The booster antenna 55 is defined by two coil patterns 55a and 55b located on the two main surfaces of the flexible base sheet 57 being capacitively coupled with each other. As illustrated in FIG. 14A, the coil patterns 55a and 55b loop such that induced currents generated in the coil patterns 55a and 55b flow in the same direction. In addition, the booster antenna 55 and the base sheet 57 are fixed to an inner wall of the casing 51 with the adhesive layer 59.

The booster antenna 55, as illustrated in FIG. 14B, preferably includes an LC resonance circuit and has a resonant frequency that corresponds to the carrier frequency (e.g., about 13.56 MHz).

In this preferred embodiment, the coil axis of the booster antenna 55 preferably is parallel or substantially parallel with the coil axis of the antenna conductor 21 of the reader/writer antenna module 1. The outer dimensions of the booster antenna 55 are larger than those of the antenna conductor 21. In addition, the opening of the coil of the antenna conductor 21 is arranged so as to be positioned inside the opening of the coil of the booster antenna 55. In particular, the position of the antenna conductor 21 is arranged in the vicinity of the positions of the coil patterns 55*a* and 55*b* of the booster antenna 55 so that the antenna conductor 21 and the booster antenna 55 are coupled with each other via a magnetic field. The coil axis of the booster antenna 55 and the coil axis of the antenna conductor 21 may be arranged so as to be perpendicular or substantially perpendicular to each other.

At the time of transmission, a transmission signal generated by a wireless IC (not illustrated) is transmitted to the booster antenna 55 via the antenna conductor 21. Then, the transmission signal is transmitted to the antenna of a communication partner from the booster antenna 55. On the other hand, at the time of reception, a signal transmitted from the antenna of the communication partner is received by the booster antenna 55. Then, the reception signal is transmitted to the wireless IC via the antenna conductor 21.

Thus, the antenna conductor 21 and the booster antenna are coupled with each other via a magnetic field. Consequently, there is no need for the booster antenna 55 to be connected to a feeder circuit via contact pins or flexible cables.

In order to improve the transmission efficiency of a high-frequency signal, it is preferable that the antenna conductor 21 have a resonant frequency that corresponds to the carrier frequency. Sometimes the resonant frequency of the booster antenna 55 varies after coupling depending on the degree of electromagnetic coupling between the booster antenna 55 and the antenna conductor 21. The degree of coupling is determined by design factors such as the distance between the antenna conductor 21 and the booster antenna 55 and the areas of the openings of the coils. Consequently, the resonant frequency of the antenna conductor 21 may be set so be equal to the carrier frequency (e.g., about 13.56 MHz) after coupling with the booster antenna 55.

In this preferred embodiment, a case was described in which the antenna conductor 21 and the booster antenna 55 are preferably coupled with each other via a magnetic field, but they may instead be coupled with each other via an electric field.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A reader/writer antenna module comprising:
   a flexible substrate including a first base portion, a second base portion and a bending portion that connects the first base portion and the second base portion to each other;
   an antenna conductor provided to the first base portion;
   a chip component that is mounted on a first main surface of the second base portion and is included in an RF circuit;
   a flexible connection conductor that is provided to the bending portion and electrically connects the antenna conductor and the chip component to each other; and
   a magnetic layer that is provided on a first main surface of the first base portion; wherein
   the flexible substrate has a folded structure that is folded such that the first main surface of the first base portion and the first main surface of the second base portion face each other; and
   the magnetic layer is arranged between the antenna conductor and the chip component.

2. The reader/writer antenna module according to claim 1, wherein the second base portion includes a ground conductor and the chip component is arranged between the magnetic layer and the ground conductor.

3. The reader/writer antenna module according to claim 1, wherein an adhesive layer is provided on a surface of the magnetic layer, and the magnetic layer and the chip component are adhered to each other via the adhesive layer to maintain the folded structure.

4. The reader/writer antenna module according to claim 3, further comprising a plurality of chip components, wherein the adhesive layer includes a sheet-shaped adhesive sheet and the adhesive sheet is adhered to an upper surface of one of the chip components having a greatest height.

5. The reader/writer antenna module according to claim 4, wherein the chip component having the greatest height is mounted on a side of the second base portion that is farther away from the bending portion than a position in a center of the second base portion.

6. The reader/writer antenna module according to claim 1, wherein
   the flexible substrate includes a flexible resin sheet; and
   the first base portion, the second base portion and the bending portion are integrally formed using the flexible resin sheet.

7. The reader/writer antenna module according to claim 6, wherein in at least the first base portion and the second base portion, the flexible substrate is a multilayer body in which a plurality of the flexible resin sheets are stacked on top of one another.

8. The reader/writer antenna module according to claim 6, wherein the connection conductor is arranged on an inner side of the flexible resin sheet in the folded structure.

9. The reader/writer antenna module according to claim 1, further comprising a plurality of chip components, wherein, a longitudinal direction of one of the chip components arranged on a side of the second base portion that is closer to the bending portion than a position in a center of the second base portion, is parallel or substantially parallel with a boundary line between the second base portion and the bending portion.

10. The reader/writer antenna module according to claim 1, wherein
    the first base portion includes a single layer flexible resin sheet; and
    the antenna conductor is one of a two-layer coil-shaped antenna conductor located on the front and back surfaces of the single layer flexible resin sheet, or a single-layer coil-shaped antenna provided on only the first main surface or the second main surface of the first base portion.

11. The reader/writer antenna module according to claim 1, wherein the antenna conductor includes a plurality of turns or only one turn.

12. The reader/writer antenna module according to claim 1, wherein the bending portion is connected to the first base portion and the second base portion at a side of surfaces opposite to the first main surfaces or the second main surfaces of the first and second base portions, and the ground conductor is provided in an inner layer of the second base portion.

13. The reader/writer antenna module according to claim 1, wherein further comprising a plurality of chip components, wherein upper surfaces of the chip components having a greatest height among the plurality of chip components mounted on the first main surface of the second base portion define surfaces to be adhered to an adhesive layer that adheres the magnetic layer and the chip component to each other to maintain the folded structure, and the connection conductor in the bending portion is provided between layers of flexible resin sheets of the flexible substrate.

14. The reader/writer antenna module according to claim 1, wherein the antenna conductor is exposed on the second main surface of the first base portion on which the magnetic layer is not provided, surface conductors are provided on the second main surface of the second base portion on the chip component is not mounted, the surface conductors are electrically connected to the inner conductors and interlayer conductors within the second base portion.

15. The reader/writer antenna module according to claim 14, wherein in the folded structure, the antenna conductor and the surface conductors are exposed on surfaces of the reader/writer antenna module.

16. The reader/writer antenna module according to claim 14, further comprising a first hook portion provided on the first base portion and a second hook portion provided on the second base portion engaged with each other.

17. The reader/writer antenna module according to claim 1, wherein the first base portion has a twice-folded structure, and a first hook portion is provided on the first base portion and a second hook portion is provided on the second base portion and is engaged with the first hook portion.

18. An antenna device comprising:
   the reader/writer antenna module according to claim 1;
   a printed wiring board on a surface of which the reader/writer antenna module is mounted;
   a booster antenna that is arranged to be coupled with the antenna conductor of the reader/writer antenna module via an electromagnetic field and that has outer dimensions that are larger than those of the antenna conductor; and
   a casing that houses the printed wiring board and the booster antenna.

19. The antenna device according to claim 18, wherein the booster antenna includes two coil patterns that are located on two main surfaces of the flexible substrate and are capacitively coupled with each other, and the booster antenna includes an LC resonance circuit and has a resonant frequency that corresponds to a carrier frequency.

20. The antenna device according to claim 18, wherein the antenna conductor and the booster antenna are coupled with each other via a magnetic field or an electric field.

* * * * *

UNITED STATES PATENT AND TRADEMARK OFFICE
CERTIFICATE OF CORRECTION

| | | |
|---|---|---|
| PATENT NO. | : 8,851,390 B2 | Page 1 of 1 |
| APPLICATION NO. | : 13/731207 | |
| DATED | : October 7, 2014 | |
| INVENTOR(S) | : Nobuo Ikemoto | |

It is certified that error appears in the above-identified patent and that said Letters Patent is hereby corrected as shown below:

Title Page

Foreign Application Priority Data item (30) should be added on the title page of the Patent as follows:

Sept. 14, 2010 (JP).................................2010-205454

Signed and Sealed this
Third Day of March, 2015

Michelle K. Lee
*Deputy Director of the United States Patent and Trademark Office*